No. 700,424. Patented May 20, 1902.
E. VOM HOFE.
FISHING REEL.
(Application filed Jan. 9, 1902.)
(No Model.)
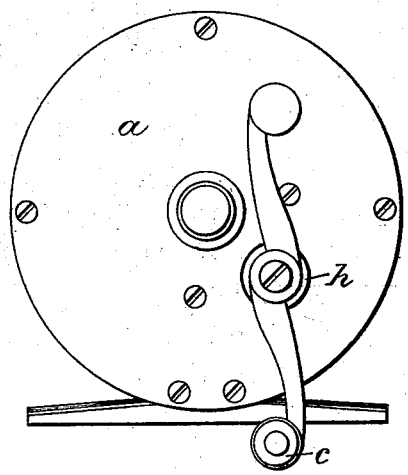
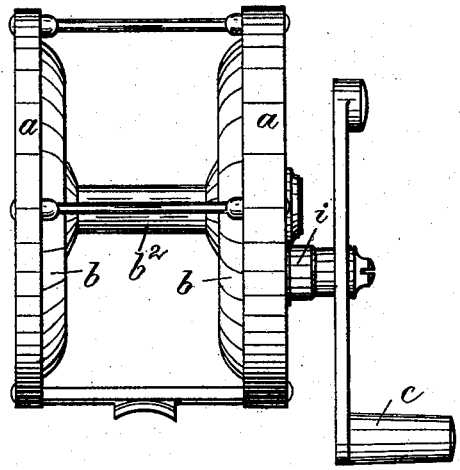
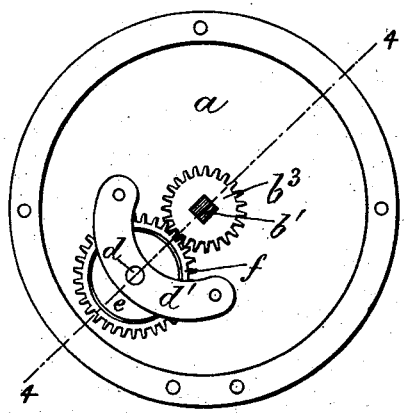
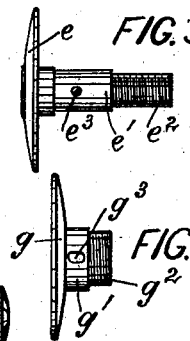
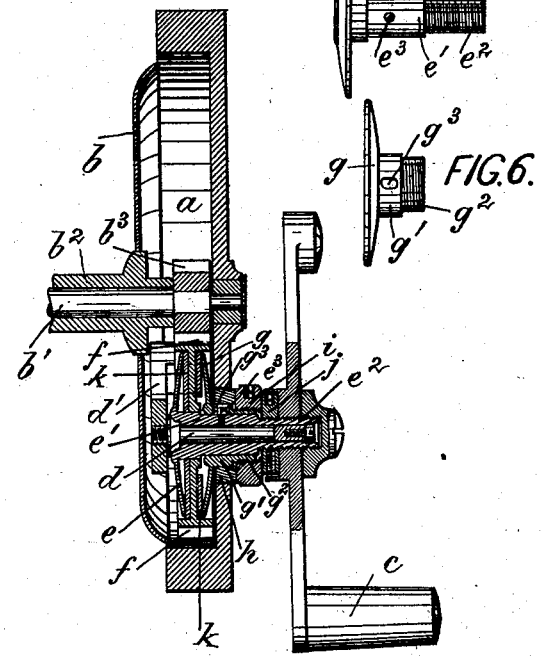
Witnesses:
Inventor:
Edward vom Hofe
by his attorneys
Roeder & Briesen

United States Patent Office.

EDWARD VOM HOFE, OF NEW YORK, N. Y.

FISHING-REEL.

SPECIFICATION forming part of Letters Patent No. 700,424, dated May 20, 1902.

Application filed January 9, 1902. Serial No. 88,967. (No model.)

*To all whom it may concern:*

Be it known that I, EDWARD VOM HOFE, a citizen of the United States, and a resident of New York city, county and State of New York, have invented certain new and useful Improvements in Fishing-Reels, of which the following is a specification.

This invention relates to a fishing-reel of the class in which a friction-brake is interposed between the handle and the spool, so that the line can be run out under tension by the fish, while the handle is held in a fixed position. In this way the line need not be reeled out constantly while the fish is hooked, overrunning and fouling of the line are prevented, and any injury to the hand, owing to a violent jerk on the line, is avoided.

In the accompanying drawings, Figure 1 is a side view of my improved fishing-reel; Fig. 2, a rear view of the same; Fig. 3, an inner face view of one of the heads $a$; Fig. 4, an enlarged section on line 4 4, Fig. 3; Fig. 5, a detail of brake-disk $e$, and Fig. 6 a detail of brake-disk $g$.

The letters $a$ $a$ represent the heads of the fishing-reel, in which is hung a shaft $b'$. Upon this shaft is fitted the hollow shaft $b^2$ of the line-carrying spool $b$. The shaft $b'$ is provided with a toothed wheel $b^3$, that receives motion from the handle $c$ by an interposed friction-brake and multiplying gearing in the following manner:

To the inner face of one of the heads $a$ is secured a bridge $d'$, carrying a pivot $d$, that projects outwardly through a perforation of head $a$. Upon this pivot is rotatably mounted a hollow shaft $e'$, threaded at its outer end, as at $e^2$, and carrying at its inner end a relatively fixed brake-disk $e$. This brake-disk bears frictionally against the inner face of a toothed wheel $f$, rotatably mounted upon hollow shaft $e'$ and intergeared with toothed wheel $b^3$ of spool $b$. The outer face of the wheel $f$ is engaged by a second brake-disk $g$, having a tubular hub $g'$, that is free to slide on hollow shaft $e'$. The hub $g'$ has a threaded outer end $g^2$ and an elongated slot $g^3$, engaged by a pin $e^3$ of shaft $e'$. Thus the hub $g'$ and disk $g$, while being axially movable, are not rotatable upon shaft $e'$. The inner cylindrical end of hub $g'$ is fitted in a bushing $h$ of head $a$, while its outer threaded end $g^2$ carries a nut $i$. This nut is adapted to contact at its outer face with a threaded collar $j$, mounted upon the outer threaded end of shaft $e'$, which end also carries the handle $c$. Between the two brake-disks $e$ $g$ and the faces of wheel $f$ are interposed suitable washers $k$.

When the handle $c$ is rotated, it will rotate by shaft $e'$ both of the friction-disks $e$ and $g$, and the latter will take along and rotate wheel $f$ by frictional contact. The wheel $f$ will in turn rotate the spool $b$ by gear-wheel $b^3$. Thus it will be seen that the handle is not positively intergeared with the spool, but that a friction-brake is interposed between them. Consequently the fish can play the line out by overcoming the friction of the brake, and thus rotating the spool, so that any sudden pull or jerk is prevented. So, also, when the fish first takes hold of the line or "bites" a violent rotation of the handle and a consequent injury to the hand are avoided, a comparatively small force being necessary to hold the handle stationary.

By turning the nut $i$ the distance between the friction-disk $g$ and the wheel $f$ may be adjusted to set the tension of the brake.

What I claim is—

1. In a fishing-reel, the combination with the handle and the spool, of a frictional connection between the handle and the spool, comprising a shaft having a loose gear mounted thereon and friction-disks carried by the shaft to engage each side of said gear, and means for intergearing the loose gear with the spool.

2. In a fishing-reel, the combination with the spool having a gear, of a shaft carrying friction-disks, a gear loose upon the shaft between the friction-disks, and meshing with the spool-gear, whereby both faces of the loose gear serve as braking surfaces.

3. In a fishing-reel, the combination with the spool and the handle, of a hollow shaft carrying friction-disks and a loose gear between the disks, means for axially adjusting one of said friction-disks, and means for intergearing the loose gear with said spool.

4. In a fishing-reel, the combination of a pivot having a tubular shaft mounted thereon, said shaft carrying a fixed friction-disk, a longitudinally-movable friction-disk and a loose gear between the friction-disks to be engaged thereby, a nut upon the hub of the movable disk to adjust the same, a handle on the shaft for rotating the same, a spool, and means for intergearing the loose gear with said spool.

Signed by me at New York city, county and State of New York, this 8th day of January, 1902.

EDWARD VOM HOFE.

Witnesses:
　WILLIAM SCHULZ,
　F. V. BRIESEN.